US012639577B2

(12) United States Patent
Woo et al.

(10) Patent No.: US 12,639,577 B2
(45) Date of Patent: May 26, 2026

(54) SYSTEMS AND METHODS FOR SELF SUPERVISED MULTI-VIEW REPRESENTATION LEARNING FOR TIME SERIES

(71) Applicant: Salesforce, Inc., San Francisco, CA (US)

(72) Inventors: Gerald Woo, Singapore (SG); Doyen Sahoo, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 1104 days.

(21) Appl. No.: 17/479,565

(22) Filed: Sep. 20, 2021

(65) Prior Publication Data

US 2022/0261651 A1     Aug. 18, 2022

Related U.S. Application Data

(60) Provisional application No. 63/146,906, filed on Feb. 8, 2021.

(51) Int. Cl.
| | |
|---|---|
| *G06N 3/084* | (2023.01) |
| *G06N 3/04* | (2023.01) |
| *G06N 3/045* | (2023.01) |
| *G06N 20/00* | (2019.01) |

(52) U.S. Cl.
CPC ............... *G06N 3/084* (2013.01); *G06N 3/04* (2013.01); *G06N 20/00* (2019.01); *G06N 3/045* (2023.01)

(58) Field of Classification Search
CPC ........... G06N 3/04; G06N 3/045; G06N 3/084
See application file for complete search history.

(56) References Cited

U.S. PATENT DOCUMENTS

| | | | | |
|---|---|---|---|---|
| 2021/0319266 A1* | 10/2021 | Chen | ........................ | G06N 3/08 |
| 2021/0374570 A1* | 12/2021 | Cheng | ................... | G06N 3/045 |
| 2021/0383225 A1* | 12/2021 | Grill | ...................... | G06N 3/08 |
| 2022/0164585 A1* | 5/2022 | Ayvaci | ................... | G06N 3/045 |

OTHER PUBLICATIONS

Hassani, K. et al., Contrastive Multi-view Representation Learning on Graphs, 2020, arXiv 2006.05582 (Year: 2020).*
Tian Y. et al., Contrastive Multiview Coding, 2020, arXiv 1906.05849 (Year: 2020).*
Tian, X., Deep Multi-View Feature Learning for EEG-Based Epileptic Seizure Detection, Sep. 2019, IEEE, Transactions on Neural Systems and Rehabilitation Engineering, pp. 1962-1972 (Year: 2019).*

(Continued)

*Primary Examiner* — Matthew Ell
*Assistant Examiner* — Louis Christopher Nye
(74) *Attorney, Agent, or Firm* — Haynes and Boone, LLP

(57) ABSTRACT

A multi-view contrastive relational learning framework is provided. In the multi-view contrastive relational learning framework, contrastive learning is augmented with a multi-view learning signal. The auxiliary views guide an encoder of the underlying time series data's main view, by using an inter-sample similarity structure as a learning signal to learn representations which encode information from multiple views.

20 Claims, 12 Drawing Sheets

300B

Multiview Contrastive Relational Learning

(56) References Cited

OTHER PUBLICATIONS

Zhang, C., Improving multiview face detection with multi-task deep convolutional neural networks, 2014, IEEE, Winter Conference on Applications of Computer Vision (Year: 2014).*

Jing, X., Intra-view and Inter-view Supervised Correlation Analysis for Multi-view Feature Learning, 2014, Association for the Advancement of Artificial Intelligence, pp. 1-8 (Year: 2014).*

Chen, T. et al., A Simple Framework for Contrastive Learning of Visual Representations, 2020, Proceedings of the 37th International Conference on Machine Learning, PMLR 119, pp. 1-11 (Year: 2020).*

Khosla, P. et al., Supervised Contrastive Learning, 2020, 34th Conference on Neural Information Processing Systems NeurIPS 2020, pp. 1-13 (Year: 2020).*

Caron, M. et al., Unsupervised Learning of Visual Features by Contrasting Cluster Assignments, Jan. 2021, 34th Conference on Neural Information Processing Systems NeurIPS 2020, pp. 1-23 (Year: 2021).*

Haoyl Fan, et al., Self-Supervised Time Series Representation Learning by Inter-Intra Relational Reasoning, arXiv:2011.13548 [cs.LG], Nov. 27, 2020, pp. 1-19.

Jean-Yves Franceshi et al., Unsupervised Scalable Reprsentation Learning for Multivariate Time Series, 33rd Conference on Neural Informational Processing Systems (NeurIPS 2019), pp. 1-12, Vancouver Canada.

Dani Klyasseh et al., CLOCS: Contrastive Learning of Cardiac Signals Across Space, Time, and Patients, arXiv:2005.13249v2 [cs.LG], pp. 1-39.

Sana Tonekaboni et al., Unsupervised Representation Learning for Time Series with Temporal Neighborhood Coding, In International Conference on Learning Representations, http://www.cs.toronoto.edu/~stonekaboni/, pp. 1-17.

* cited by examiner

200

Single View Contrastive Learning

Multiview Contrastive Relational Learning

400

Receiving, via a data interface, a training dataset of time-series data samples 410

Generating, by a main encoder, a first representation of a first transformed data sample of a training data sample from the training dataset 420

Generating, by one or more auxiliary encoders in parallel to the main encoder, one or more auxiliary representations of different transformed version of the training data sample, respectively 430

Computing a contrastive loss component based on similarities among the one or more auxiliary representations that are generated from a same encoder 440

Computing a relational loss component based on normalized similarities by comparing the first representation and the one or more auxiliary representations 450

Updating the one or more auxiliary encoders based on the contrastive loss component and the relational loss component via backpropagation 460

*FIG. 4*

| Dataset | Train | Val/Test | Length | Classes |
|---|---|---|---|---|
| CricketX | 390 | 195 | 300 | 12 |
| DLD | 79 | 39 | 288 | 7 |
| MFPT | 1287 | 643 | 1024 | 15 |
| ACSF1 | 100 | 50 | 1460 | 10 |
| DPOC | 438 | 219 | 80 | 2 |
| Haptics | 231 | 115 | 1092 | 5 |
| SHMC2 | 450 | 225 | 1500 | 6 |

*FIG. 5*

| Dataset | Model Architecture | Encoding Size |
|---------|--------------------|---------------|
| TSA | Conv4 | 64 |
| TSCR | Conv4 | 64 |
| MFPT | Conv4 | 64 |
| Afib | Conv4 | 64 |
| Afib* | Conv6 | 64 |
| HAPT | GRU | 10 |

*FIG. 6*

| Method | CricketX | DLD | MPPT | ACSF1 | DPOC | Haptics | SHMC2 |
|---|---|---|---|---|---|---|---|
| Random Weights | 36.90 (0.92) | 32.95 (2.57) | 46.68 (2.35) | 56.79 (4.60) | 64.68 (2.25) | 31.48 (1.43) | 24.50 (2.70) |
| Supervised | 62.44 (1.53) | 37.05 (1.61) | 80.29 (0.80) | 70.80 (3.03) | 81.83 (1.24) | 46.09 (3.94) | 47.30 (3.89) |
| SimCLR | 57.08 (1.25) | 37.37 (3.43) | 68.15 (0.66) | 60.40 (8.65) | 79.27 (1.50) | 50.61 (1.98) | 58.65 (2.54) |
| MoCo | 68.96 (1.71) | 47.89 (6.00) | 68.40 (0.75) | 60.40 (3.85) | 80.18 (1.19) | 48.70 (2.95) | 58.74 (0.82) |
| BYOL | 55.94 (1.67) | 20.53 (6.00) | 65.09 (0.34) | 68.88 (5.76) | 81.19 (0.56) | 53.04 (3.31) | 56.31 (1.35) |
| SelfTime | 68.60 (0.66) | 49.10 (2.93) | 78.48 (0.94) | 71.60 (1.11) | 80.68 (1.37) | 42.54 (1.09) | 58.44 (2.88) |
| MV-CRL | 71.56 (1.67) | 57.89 (1.86) | 70.93 (0.16) | 72.00 (2.00) | 82.48 (1.10) | 53.22 (2.41) | 60.90 (1.70) |
| MoCo* | 69.79 (2.24) | 55.79 (2.20) | 77.38 (0.23) | 66.40 (1.67) | 80.83 (1.27) | 53.04 (2.61) | 59.10 (2.02) |
| MV-CRL* | 74.79 (1.36) | 60.0 (3.90) | 78.39 (0.41) | 71.60 (1.67) | 82.66 (0.38) | 52.87 (0.73) | 62.43 (2.73) |

*FIG. 7*

| Method | AFib | | HAPT | |
|---|---|---|---|---|
| | Accuracy | AUPRC | Accuracy | AUPRC |
| Supervised* | 94.81 (0.28) | 0.67 (0.01) | | |
| Supervised | 97.74 (0.32) | 0.70 (0.04) | 74.48 (0.57) | 0.50 (0.01) |
| CPC* | 68.64 (0.49) | 0.42 (0.01) | - | - |
| T-Loss* | 75.51 (1.26) | 0.47 (0.00) | - | - |
| TNC* | 77.79 (0.84) | 0.55 (0.01) | - | - |
| CPC | 75.08 (1.07) | 0.47 (0.05) | 49.43 (0.59) | 0.28 (0.02) |
| T-Loss | 70.40 (1.23) | 0.45 (0.03) | 52.50 (0.87) | 0.29 (0.00) |
| TNC | 74.93 (0.77) | 0.27 (0.01) | 71.05 (0.97) | 0.42 (0.00) |
| SimCLR | 85.05 (0.69) | 0.55 (0.02) | 75.11 (0.39) | 0.41 (0.01) |
| MoCo | 88.85 (0.34) | 0.67 (0.01) | 74.94 (0.50) | 0.42 (0.02) |
| BYOL | 85.62 (1.05) | 0.64 (0.09) | 72.24 (0.28) | 0.32 (0.01) |
| MV-CRL | 91.18 (0.34) | 0.66 (0.01) | 76.00 (1.71) | 0.44 (0.02) |

FIG. 8

| View | CricketX | DLD | ACSF1 |
|---|---|---|---|
| None | 68.96 | 47.89 | 60.40 |
| MAF (16) | 72.29 | 51.58 | 66.00 |
| MAF (32) | 70.31 | 54.74 | 69.20 |
| Differencing (1) | 70.10 | 50.53 | 68.40 |
| Differencing (2) | 71.77 | 50.00 | 68.40 |
| DFT | 69.79 | 44.21 | 65.60 |
| All | 71.56 | 57.89 | 72.00 |

*FIG. 9*

| $\lambda_{CRL}$ | 0.05 | 0.1 | 0.5 | 1 |
|---|---|---|---|---|
| CricketX | 67.81 | 71.56 | 67.29 | 70.10 |
| DLD | 48.95 | 57.89 | 46.32 | 34.74 |
| ACSF1 | 70.40 | 72.00 | 60.00 | 68.40 |

*FIG. 10*

SYSTEMS AND METHODS FOR SELF SUPERVISED MULTI-VIEW REPRESENTATION LEARNING FOR TIME SERIES

RELATED APPLICATIONS

This application claims priority to U.S. Provisional Patent Application No. 63/146,906, filed Feb. 8, 2021, which is entirely incorporated herein by reference for all purposes.

TECHNICAL FIELD

The embodiments relate generally to time series data, and more specifically to training a multi-view self-supervised learning framework to generate representations of time series data.

BACKGROUND

Time series constitutes a prevalent form of data whose analysis has several important applications in areas, such as business, medicine, aerospace, and info-communications. However, because time-series data is a high dimensional and complex form of data, it is often challenging and expensive to label time-series data in order to perform supervised learning tasks, such as time-series classification. For example, in the medical setting, the task of identifying cardiac abnormalities from electrocardiogram (ECG) data requires expert knowledge. Another example is emotion recognition through electroencephalogram (EEG) and ECG signals, in which elaborate experiments are carried out to collect labeled data. Unlabeled data, on the other hand, is usually cheaply available. It is thus important, to use ample amounts of unlabeled data to learn an effective and general representation of the time series data to perform tasks like classification, even when only limited amounts of labeled data are available.

BRIEF DESCRIPTION OF THE DRAWINGS

FIG. 4 is a simplified diagram of a method for training a multi-view self-supervised learning framework, according to some embodiments.

FIG. 5 is a table showing statistics of time series classification datasets. Train, validation, and test splits represent the number of samples in each set after performing a 50/25/25 split on all available samples.

FIG. 6 is a list of datasets presented in the exemplary experiments, and the respective models and encoding sizes used.

FIG. 7 is a table showing linear evaluation accuracies (+/−standard deviation) on TSCR, TSA, and MFPT dataset. * indicates models trained for 6,400 epochs.

FIG. 8 is a table showing linear evaluation performance metrics (+/−standard deviation) on long time series datasets.

FIG. 9 is a table showing linear evaluation accuracies comparing single view, single auxiliary view, and all views approaches.

FIG. 10 is a table showing linear evaluation accuracies.

In the figures, elements having the same designations have the same or similar functions.

DETAILED DESCRIPTION

Time series data can often take a complex form and thus make labeling task challenging and expensive. For example, in the medical setting, the task of identifying cardiac abnormalities from ECG data requires expert knowledge. Another example is emotion recognition through EEG and ECG signals, in which elaborate experiments have to be carried out to collect labeled data.

In view of a need to efficiently use time series data for machine learning model training, embodiments described herein provide a multi-view contrastive relational learning (MV-CRL) framework that comprises a number of parallel contrastive learning branches, each of which adopting a specific transformation of original data sample of time-series data as contrastive input. Specifically, for each branch, an auxiliary view may be generated as a specific transformation is applied to time-series data. The transformed time-series data is then encoded by an encoder at a respective branch, into auxiliary time series representations. The encoded auxiliary representations from multiple branches are used to compute a loss objective based on inter-sample relationships between the one or more auxiliary time series representations and an identity transformation of the original data samples of the time series data.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1:
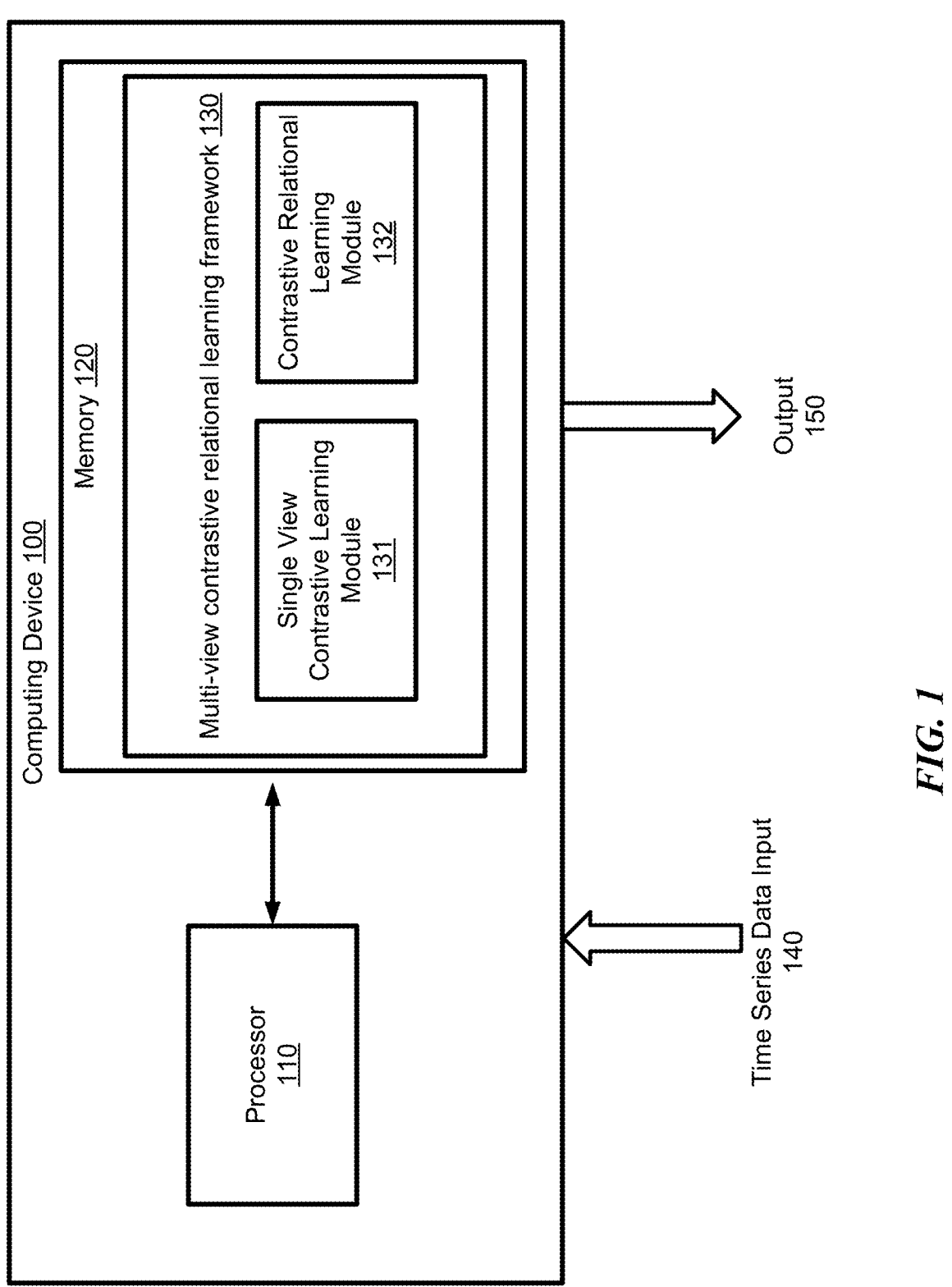
FIG. 1 is a simplified diagram of a computing device that implements a multi-view contrastive relational learning framework, according to some embodiments.

FIG. 1 is a simplified diagram of a computing device 100 for implementing a multi-view contrastive relational learning framework, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a multi-view contrastive relational learning framework 130 that may be used to implement and/or emulate the systems and models, and/or to implement any of the methods described further herein. A trained multi-view contrastive relational learning framework 130 may receive input that includes a time series data 140 and generate representations of time series data 150 as output.

In some embodiments, the multi-view contrastive relational learning framework 130 includes a single view contrastive learning module 131 and a contrastive relational learning module 132. Specifically, the single view contrastive learning module is configured to compute a contrastive loss component based on similarities among one or more individual views, such as one or more auxiliary representations, e.g., specific transformation of time-series data. The contrastive relational learning module 132 is configured to compute a relational loss component based on normalized similarities by comparing a first representation, e, g., original data samples of time-series data, and one or more auxiliary representations, e.g., specific transformation of the time-series data.

Figure 2:
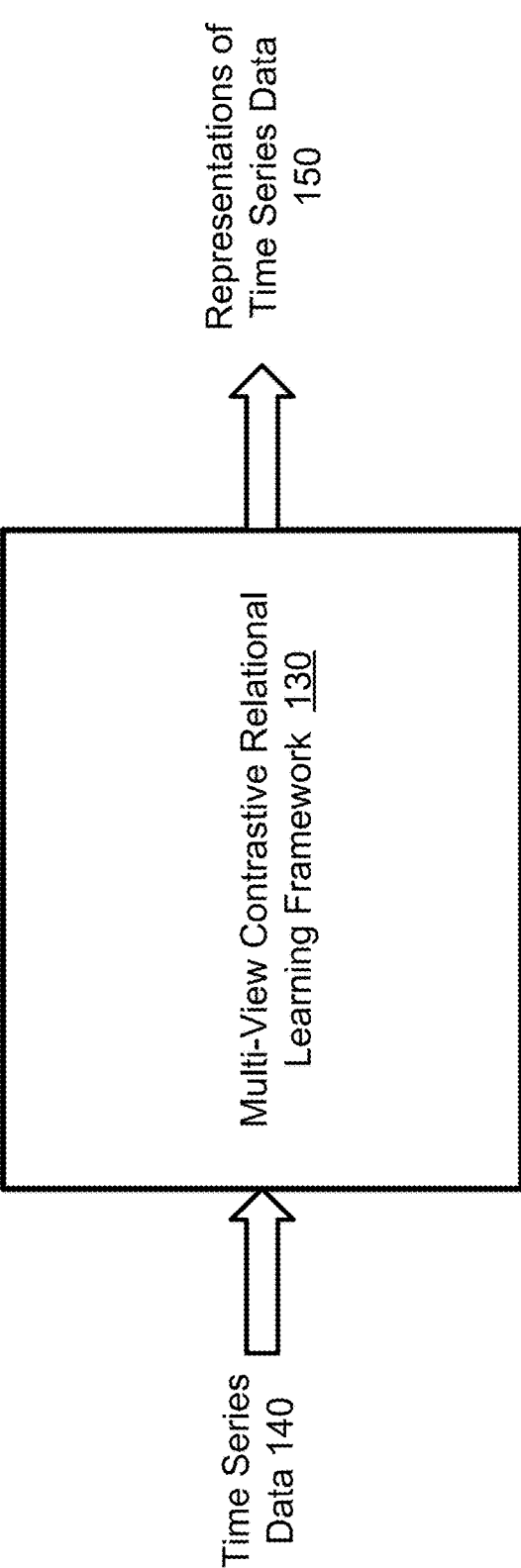
FIG. 2 is block diagram of a multi-view contrastive relational learning framework, according to some embodiments.

FIG. 2 is a block diagram 200 of a multi-view contrastive relational learning framework, according to an embodiment. As discussed above, multi-view contrastive relational learning framework receives time series data 140 and generates representations of time series data 150 as output. In some embodiments, given a window of time series data, multi-view contrastive relational learning framework 130 may leverage information from various specific transformations of the time series data called views, auxiliary views or auxiliary representations. The views provide a stronger learning signal by capturing important information about the time series data. Multi-view contrastive relational learning framework 130 may use the instance discrimination task as a base self-supervision signal on each individual encoder and design the multi-view representation based on a contrastive relational loss ("MV-CRL"). The multi-view contrastive relational learning framework 130 extends a single view case to a multi-view case and is able to be applied on top of conventional self-supervised learning methods.

To generate representations of time series data 150, multi-view contrastive relational learning framework 130 may be trained using training set $$X = \{x_i\}_{i=1}^N$$

4 of N time series, where each sample $x_i \in \mathbb{R}^{M \times T}$ is a time series data of dimensionality M and length T. The goal of self-supervised learning is to learn a function $f_\theta$: $\mathbb{R}^{M \times T} \to \mathbb{R}^D$, which results in good D dimensional representation of time series data. One way to measure whether a representation is a good representation, is to use the representation to evaluate performance of a downstream task, such as classification, but in a regime where limited labeled data is available. During training, the time series data may be fed into one or more encoders of multi-view contrastive relational learning framework 130, which may generate representations of time series data 150.

In alternative embodiments, multi-view contrastive relational learning framework 130 may be trained to learn a representation for a sub-sequence or a window of single long time series data, and then predict labels of such windows in the downstream task. In this case, the training set may be $$X = \{x_t\}_{t=1}^N,$$

where each sample is $x_t \in \mathbb{R}^M$ is an M-dimensional point. For a window length W, multi-view contrastive relational learning framework 130 may learn a function $f_\theta$: $\mathbb{R}^{M \times W} \mapsto \mathbb{R}^D$. During downstream classification, for a given the window length W, training set X may be segmented into nonoverlapping windows of length W, and the label of each segment from the training set X may be decided by a majority vote. In some embodiments, the new dataset may be denoted $$\tilde{X} = \{(\tilde{x}_i, \tilde{y}_i)\}_{i=1}^{N/W},$$

where each $\tilde{x}_i = \{x_{t+iW}, \ldots, \tilde{x}_{t+(i+1)W}\}$ is a time series of length W.

In some embodiments, to learn representations of time series data 150, multi-view contrastive relational learning framework 130 may apply transformations (also called "views") to time series data 140 to obtain insightful information about the time-series data and use the information to guide the representation learning of the original or main view. Specifically, multi-view contrastive relational learning framework 130 may consider L views. The view functions V may be defined as $V_i$: $\mathbb{R}^{M \times T} \mapsto \mathbb{R}^{M_i \times T_i}$. Multi-view contrastive relational learning framework 130 may include an encoder for each view. The encoders may be represented as $f_{\theta_1}, f_{\theta_2}, \ldots, f_{\theta_L}$, where $f_{\theta_i}$: $\mathbb{R}^{M_i \times T_i} \to \mathbb{R}^D$. Each encoder may encode time series data for a view and generate a representation of the view as a D dimensional vector. In some embodiments, each encoder may be unique and may not be shared with other views. In some embodiments, the first view, $V_1$ may be the main view (identity transformation), while all other views may be auxiliary views or specific transformations.

The multi-view contrastive relational learning framework 130 may learn the encoders, or the representation function for the encoders, such that the encoders may generate a good representation for each view individually, and consequently guide and help learn better representations from these auxiliary views for the main view. For downstream tasks, the main view, i.e., view $V_1$ may be considered to extract the feature representation of the time series data 140. Each view's encoder is learnt through a contrastive learning approach, such that important representational information may be captured by that view. At the same time, using contrastive relational learning, the auxiliary encoders may impart knowledge from their respective views to the main encoder, and vice versa.

Figure 3A:
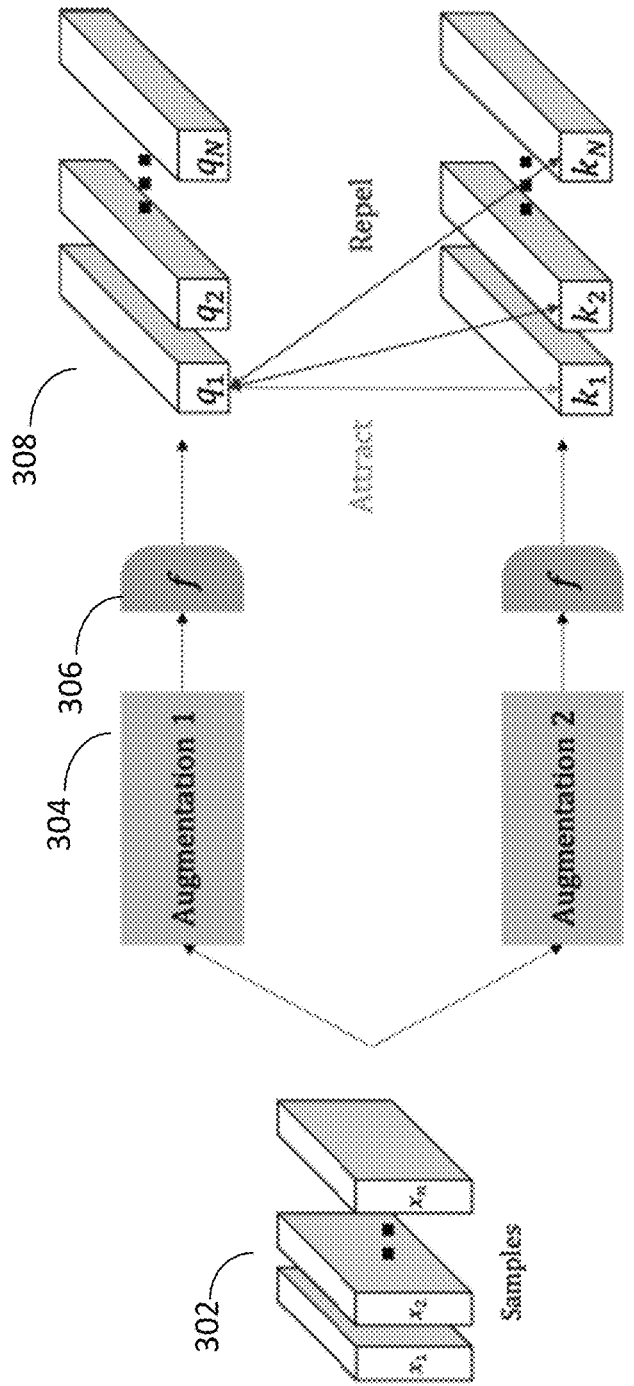
FIGS. 3A-3B are block diagrams illustrating architecture for single view contrastive learning and multi-view contrastive relational learning, respectively, according to some embodiments.
Figure 3B:
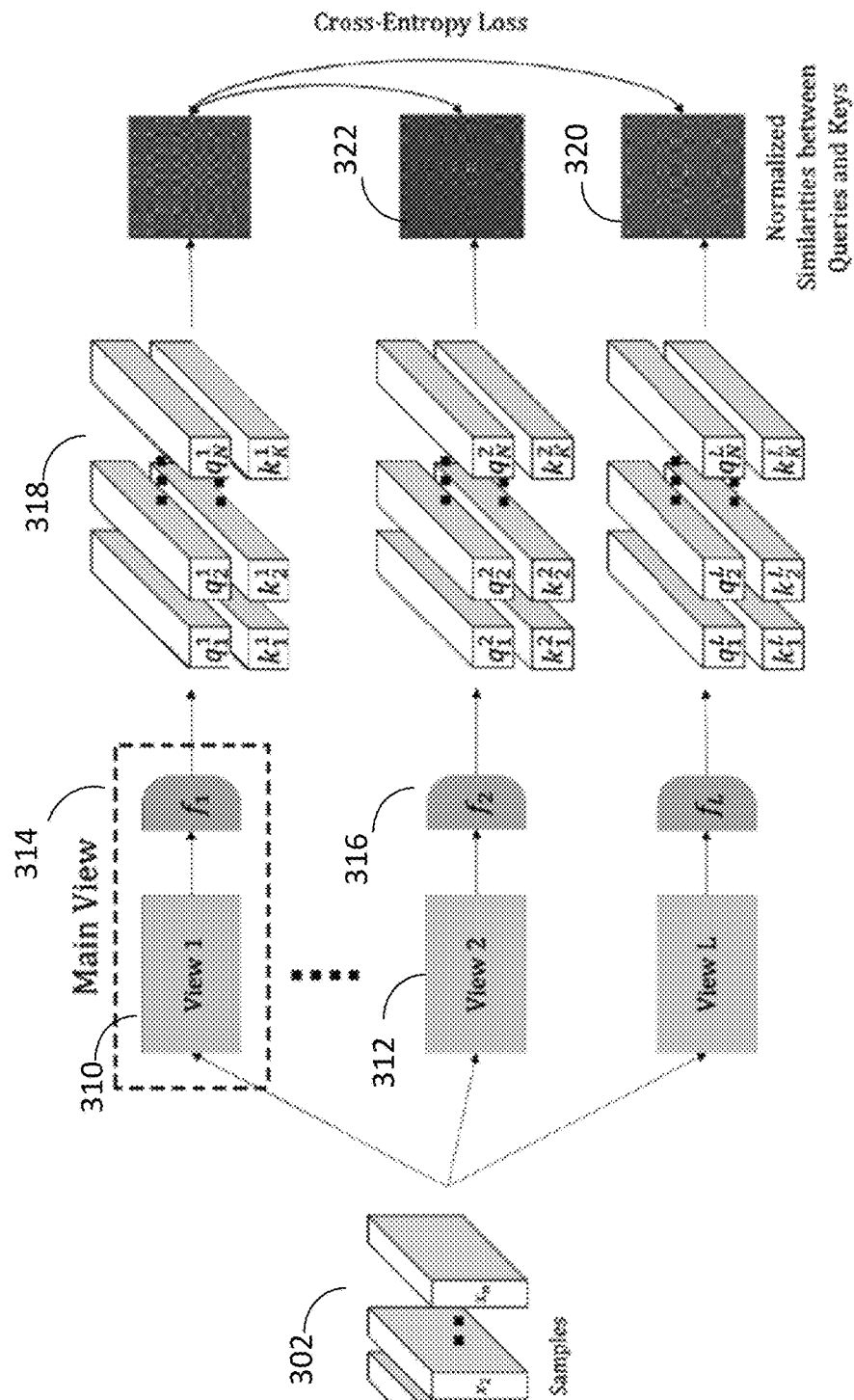

FIG. 3A is a block diagram 300a illustrating single view contrastive learning, and FIG. 3B is a block diagram 300b illustrating multi-view contrastive relational learning, according to some embodiments. The multi-view contrastive relational learning framework 130 makes use of both single view contrastive learning (FIG. 3A) and contrastive relational learning (FIG. 3B).

In the single view contrastive learning as illustrated in FIG. 3A, an encoder for each individual view, $V_1$, performs a single view contrastive learning task in order to learn good representations within the view. In the illustrated instance discrimination task, the augmented versions 304 of two time series data from samples 302 are fed to an encoder 306 to generate vector representations 308 including queries and keys. The vector representations of the augmented versions 304 of the two time series data are attracted, while those of different time series data are repelled, which is realized by a contrastive loss, such as the InfoNCE loss.

In some embodiments, the encoder for each individual view may be trained using contrastive learning. Contrastive learning aims to maximize the agreement between positive pairs of samples and minimize the agreement between negative pairs of samples.

One of the tasks that contrastive learning may perform is an instance discrimination task. The instance discrimination task may define positive and negative pairs of samples. Given a sample, a positive pair is an augmented version of that sample, while any other sample from the dataset may be used as a negative sample. Specifically, the instance discrimination task may define a family of data augmentations T. For a single time series data $x_i$, two data augmentation operators are sampled from T (t~T and t'~T). The time series data undergoing the first transformation may be denoted as $$x_i^q = t(x_i)$$

and takes role of the query. The second transformation may be denoted as $$x_i^k = t'(x_i)$$

and takes the role of the key. Normalized representations may then be obtained, such as $$q_i = \tilde{q}_i / \|\tilde{q}_i\|_2, \text{ where } \tilde{q}_i = f_\theta(x_i^q), \text{ and } k_i = \tilde{k}_i / \|\tilde{k}_i\|_2, \text{ where } \tilde{k}_1 = f_\theta(x_i^k).$$

In some embodiments, a learnable projection head, g: $\mathbb{R}^D \mapsto \mathbb{R} D'$, which may be a multilayer perceptron (MLP) with one hidden layer, may be used to obtain the queries and keys to boost downstream performance. In this case, $$\tilde{q}_i = g(f_\theta(x_i^q)) \text{ and } \tilde{k}_i = g(f_\theta(x_i^k))$$

may be used in the self-supervised learning phase, while the representation used for downstream tasks may be $z=f_\theta(x)$.

In some embodiments, the representation function of the encoder may be learned by optimizing a contrastive relational loss including a contrastive loss, such as the InfoNCE loss, shown below:

$$\mathcal{L}_{InfoNCE} = \sum_{i=1}^{N} -\log \frac{\exp\left(q_i \cdot k_i / \tau_1\right)}{\exp\left(q_i \cdot k_i / \tau_1\right) + \sum_{j=1}^{K} \exp\left(q_i \cdot k_j / \tau_1\right)} \tag{1}$$

where $k_i$ is the positive embedding to the query, $q_i$, while there are K negative embeddings, $q_j$ obtained from other instances, and $\tau_1$ is the temperature hyperparameter.

In some embodiments, the instance discrimination task treats each instance as a distinct class. In particular, the InfoNCE loss may be a non-parametric softmax function composed with the cross-entropy loss. The label used in the cross-entropy loss is a hard-label, i.e., y=1 for the instance being queried, and y=0 for all other instances being contrasted against.

To incorporate the multi-view information into the training of the encoder for the main view, multi-view contrastive relational learning framework 130 may include contrastive relational learning. In the multi-view contrastive relational learning as illustrated in FIG. 3B, the multi-view information is transferred between the main view 310 and auxiliary views 312 via inter-sample structure. This transfer of the inter-sample relationships between the auxiliary views 312 and the main view 310 is realized by using the normalized similarities 320 between queries and keys 318 as distributions in a cross-entropy loss 322. View 1 (310) is the main view, i.e., the identity transformation of the time series data of samples 302. Other views including View 2 (312) and View L are transformations or auxiliary views of the time series data of sample 302.

In the contrastive relational learning approach as illustrated in FIG. 3B, the instance discrimination task may be relaxed in generating a cross-entropy loss. Instead of using the instance as a hard-label, multi-view contrastive relational learning framework 130 aims to transfer the inter-sample relationships from one or more auxiliary views (e.g., View 2 or View L) to the main view. To do so, multi-view contrastive relational learning framework 130 takes advantage of the inter-sample similarity structure from auxiliary views as soft-labels in a cross-entropy loss. The resulting loss component between two views $V_l$ and $V_m$ may be defined as follows:

$$\mathcal{L}_{CRL}^{V_l, V_m} = -\frac{1}{N} \sum_{i=1}^{N} \sum_{j=1}^{K} P(k_j^l | q_i^l) * \log(P(k_j^m | q_i^m)) \tag{2}$$

where $$P(k_j^l | q_i^l)$$

is the probability of j-th key being matched to the i-th query, both of view l. This probability may be obtained from the non-parametric softmax, given by:

$$P(k_j^l|q_i^l) = \frac{\exp\left(q_i^l \cdot k_j^l/\tau_2\right)}{\sum_{o=1}^{K} \exp\left(q_i^l \cdot k_o^l/\tau_2\right)} \quad (3)$$

where $\tau_2$ is the temperature hyperparameter.

Further, for a particular auxiliary view l, the transfer of inter-sample knowledge may be made symmetric between the main view and auxiliary view l by summing up the two loss components:

$$\mathcal{L}_{CRL}^{V_l} = \mathcal{L}_{CRL}^{V_1,V_l} + \mathcal{L}_{CRL}^{V_l,V_1} \quad (4)$$

The overall objective may be a combination of the contrastive loss term and the multi-view loss term:

$$\mathcal{L} = \sum_{l=2}^{L} \mathcal{L}_{InfoNCE}^{V_l} + \lambda_{CRL} \cdot \mathcal{L}_{CRL}^{V_l} \quad (5)$$

where $\lambda_{CRL}$ is a tunable hyperparameter which determines the importance of the inter-sample structure from the auxiliary views.

In some embodiments, the multi-view contrastive relational learning framework 130 relies on using high quality views (e.g., auxiliary views) that can reveal insightful information about the time series data 140. Different ways of extracting auxiliary views may be able to extract different patterns by reducing noise, as well as mapping to domains in which there are similarity structures between samples that are not present in the original time series data. These are features that learning signals such as instance discrimination and temporal heuristics are unable to explicitly take advantage of in the conventional self-supervised learning approaches for time-series. Non-limiting exemplary views may include a moving average filter view, a differencing view and a discrete Fourier transform view.

The moving average filter (MAF) view may be able to smooth a given time series data and may be used to estimate trend-cycles. Given a time series data $(x1, \ldots xT)$ and a window length w, the MAF produces a new time series data $(\tilde{x}1, \ldots \tilde{x}T-w+1)$ where $$x_t = \frac{1}{w}\sum_{i=t}^{t+w} x_i.$$

The window length is a hyperparameter which controls the time scale of the trend being extracted.

In the differencing view, the differencing operator may be used to obtain a stationary time series, but can also be interpreted as obtaining the 'change in value' from one-time step to the next, and may be given by:

$$\nabla x_t = x_t - x_{t-1} \quad (6)$$

Furthermore, the d-th order difference can be obtained as follows:

$$\nabla^d x_t = (1-B)^d x_t \quad (7)$$

where $B^d x_t = x_{t-1}$ is the backward difference operator, indicating how many times the differencing operation has been applied.

The discrete Fourier transform view provides a frequency domain view of the time series data. It maps a time series data with regular intervals into a sequence of complex numbers of equal length. Each complex number is called a Fourier coefficient, and represents a sinusoidal component at a particular frequency, which acts as basis functions of the original time series. The amplitude and phase at each frequency may be extracted and concatenated.

FIG. 4 is a simplified diagram of a method 400 for training a multi-view contrastive relational learning framework, according to some embodiments. One or more of the processes 410-460 of method 400 may be implemented, at least in part, in the form of executable code stored on non-transitory, tangible, machine-readable media that when run by one or more processors may cause the one or more processors to perform one or more of the processes 410-460.

At process 410, a training dataset of time-series data samples may be received, via a data interface. At process 420, a main encoder may generate a first representation of a first transformed data sample of a training data sample from the training dataset. For example, the first transformed data sample is identity transformation of the training data sample. At process 430, one or more auxiliary encoders may generate, in parallel to the main encoder, one or more auxiliary representations of different transformed version of the training data sample, respectively. In some embodiments, each auxiliary encoder corresponds to a specific view. For example, one or more auxiliary representations are generated using moving averages, n-th order differencing, or discrete Fourier transformation.

At process 440, a contrastive loss component may be computed based on similarities among the one or more auxiliary representations that are generated from a same encoder. For example, the contrastive loss component is generated by a non-parametric softmax function. At process 450, a relational loss component may be computed based on normalized similarities by comparing the first representation and the one or more auxiliary representations. For example, the relational loss component is computed by transferring inter-sample relationships from the one or more auxiliary representations to the first representation. At process 460, the one or more auxiliary encoders may be updated based on a combination of contrastive loss component and the relational loss component or a combined loss objective via backpropagation. The combined loss objective may be computed by combining the contrastive loss component and the relational loss component.

Method 400 may further comprise generating, at each of a plurality of encoders, a respective contrastive loss objective in response to a contrastive input of training data in the training dataset; and updating each of the plurality of encoders based on the respective contrastive loss respectively.

In some embodiments, method 400 may repeat multiple times until multi-view contrastive relational learning framework 130 is trained. Once trained, at an inference stage, the main encoder of multi-view contrastive relational learning framework 130 may generate representations of time series data 150 from time series data 140.

EXAMPLE

System Architecture and Performance

Exemplary experiments were conducted to evaluate performance of the multi-view contrastive relational learning framework in downstream tasks. In some embodiments, the multi-view contrastive relational learning framework can be trained and applied to one or more downstream tasks.

A variety of datasets time series classification datasets were evaluated, including, Cricket X and Dodger Loop Day (DLD) from the UCR Time Series Archive (TSA); ACSF1, Distal Phalanx Outline Correct (DPOC), Haptics, and SemgHandMovementCh2 (SHMC2) from the UEA & UCR Time Series Classification Repository (TSCR); and a real-world bearing datasets, Machinery Failure Prevention Technology (MFPT). The original train and test sets were combined and subsequently divided into a 50%/25%/25% train/validation/test split. A full list of the datasets with statistics can be found in FIG. 5.

Two long time series datasets, MIT-BIH Atrial Fibrillation (AFib) and Smartphone Based Recognition of Human Activities and Postural Transitions Data Set (HAPT) were further evaluated. AFib contains 25 ECG recordings, each 10 hours in duration, with two ECG signals sampled at 250 samples per seconds. Each time stamp is annotated with one of four labels. Windows of length 2500 were taken for AFib. HAPT was collected from subjects wearing waist-mounted smartphones performing daily activities, with a total of 12 class labels. The dataset consists of 6 readings per time stamp, representing the raw 3-axis accelerometer and gyroscope readings. Windows of length 50 were taken for HAPT.

The method described herein was compared to multiple SOTA self-supervised learning baselines. Due to the effectiveness of self-supervision in computer vision, the method described herein were compared to three SOTA methods, SimCLR, MoCo, and BYOL. The adaptation of these methods includes specifying a new set of random augmentations for the new input domain. Methods proposed for time series, in both the time series classification and long time series settings, were also compared.

For computer vision baselines, the original code or open-source PyTorch implementations of SimCLR1, MoCo2, and SimCLR3 were adapted. For SelfTime baselines, the original code of SelfTime was adapted to run on various different datasets. For Temporal Neighborhood Coding (TNC) baselines, the code used in TNC was adapted to run different encoder architectures as well as to be applied on different datasets. The implementations of Contrastive Predictive Coding (CPC) and Triplet Loss (T-Loss) were adapted as well.

For computer vision baseline, SimCLR is a simple contrastive learning baseline which makes use of the instance discrimination pretext task, and was originally proposed for image data, making use of mini-batch samples as negative pairs. MoCo uses the instance discrimination pretext task, and introduces the idea of a momentum encoder and dictionary as a queue. BYOL removes the need for negative samples, relying only on maximizing agreement between augmented pairs of inputs.

For time series baselines, self time was proposed specifically for time series data, making use of both inter-sample and intra-temporal relationships in a time series, and uses a parametric classification loss in the self-supervised task instead of the InfoNCE loss. Contrastive Predictive Coding (CPC) uses a probabilistic contrastive loss to learn representations which are maximally useful for predicting future samples. Triplet Loss (T-Loss) uses a basic form of negative sampling and a triplet loss. Temporal Neighborhood Coding (TNC) was proposed for time series, leveraging temporal relationships as a learning signal and ensuring two windows come from a stationary region via the ADF test.

Encoder architectures used in all baselines are the same for each dataset for a fair comparison of the method. FIG. 6 lists the architectures used in the respective experiments. Exemplary model architectures include Conv4, Conv6, GRU, and DFT Encoder. Conv4 is a simple 4-layered ConvNet. Each layer consists of a 1d convolutional layer with kernel size of 4, stride of 2, and padding of 1. Each layer has 8, 16, 32, 64 filters respectively, and uses BatchNorm and ReLU after each layer. Finally, the output is passed through an average pooling layer. The final encoding size is 64. Conv6 is composed of a 6-layered ConvNet and 2 linear layers. Each layer consists of a 1d convolution, an ELU non-linearity, BatchNorm, and optionally, a max pooling layer. The output size of the convolutional layers is 79872. The input and output sizes of the linear layers are (79872, 2048), and (2048, 64). These two layers have roughly 163,579,904 and 131,136 parameters, respectively.

In implementation, random augmentations can be used. Random augmentations for time series data can be broadly categorized into magnitude, time, and frequency domain augmentations.

In SelfTime, a composition of magnitude warping and time warping are used as augmentations for the TSA, TSCR, MFPT datasets. For AFib, and HAPT, a composition of magnitude domain augmentations (scaling, shifting, jittering) and window slicing was used, due to the lack of availability of efficient implementations of magnitude and time warping.

Random augmentations applied in the implementations include, but not limited to magnitude warping, time warping, scaling, shifting, and jittering, and window slicing. In magnitude Warping, a cubic spline is used with 4 knots sampled from N (1, 0.3). Time Warping. A cubic spline is used with 8 knots sampled from N (1, 0.2). In scaling, the time series is scaled by a single random scalar value, obtained by sampling $\alpha \sim N (0, 1)$, and each time step is $\tilde{x}t = \alpha x_t$. In shifting, the time series is shifted by a single random scalar value, obtained by sampling $\alpha \sim N (0, 1)$ and each time step is $\tilde{x}t = x_t + \alpha$. In jittering, I.I.D. Gaussian noise is added to each time step, from a distribution $\alpha_t \sim N (0, 1)$, where each time step is now $\tilde{x}_t = x_t + \alpha_t$. In window Slicing, given a window size w and time series $(x_1, \ldots x_{dw})$, where d is a hyperparameter, a subsequence of length w from the time series is randomly sampled. In a particular example, d=2 for experiments using window slicing is selected.

For all experiments, MV-CRL was implemented by generalizing the MoCo framework to the multi-view case. Thus, MV-CRL is compared to MoCo as a single view case. Furthermore, for all datasets, the following views are used: i) MAF; ii) MAF; iii) Differencing; iv) Differencing; v) DFT.

MV-CRL was evaluated by assessing its performance by comparing against other SOTA self-supervised learning methods. The contribution of single auxiliary views, and how different hyperparameters affect the downstream performance were analyzed.

To evaluate the quality of the learnt representations, classification accuracy was used as a proxy. A linear evaluation protocol was used, where a linear classifier is trained on top of a frozen encoder for the downstream classification task.

FIG. 7 shows the performance of MV-CRL against several baselines on the TSA, MFPT, and TSCR datasets. Overall, MV-CRL is a competitive method and achieves SOTA results on all of the presented datasets. Here, Self-Time uses K=16 augmentations per sample during self-supervised training, and is equivalent to increasing the number of epochs. Thus, results for more epochs on the TSCR, TSA, and MFPT datasets for fairer comparison are presented. In some cases, the performance of MV-CRL and MoCo further improves as the number of epochs was increased for the self-supervised training phase. An important detail to note is that MV-CRL is able to improve the performance over the single view case, and that the addition of views does not deteriorate the learnt representations.

Due to the baselines using an exceedingly large model (containing a linear layer with 163,579,904 parameters) for AFib, experiments were performed on a smaller model. Results for both AFib and HAPT can be found in FIG. 8.

MV-CRL achieves SOTA performance on both AFib and HAPT datasets. The difference in performance compared to TNC is not due to the different encoder architecture used by providing results for baselines using the same encoder architecture. Furthermore, MV-CRL was shown to improve over the single view case.

To investigate how each view individually contributes to the performance of MV-CRL, MV-CRL was evaluated by training with only one auxiliary view, instead of using all views at the same time. FIG. 9 shows the performance of the single view approach, various single auxiliary views, as well as all auxiliary views combined, three datasets. The proposed views improve the performance on majority of cases, and the combination of views ultimately yields the best performance.

The hyperparameter $\lambda_{CRL}$ balances the importance of the contrastive learning task with the multi-view relational learning task. Multiple values of $\lambda_{CRL} \in \{0.05, 0.1, 0.5, 1\}$ are compared. FIG. 10 shows the accuracy scores on the linear evaluation task when different values of $\lambda_{CRL}$ are used. While for some datasets a high $\lambda_{CRL}$ leads to good performance, a low value, $\lambda_{CRL}=0.1$, is picked to avoid giving too much importance to the relational learning task in the case where some views may not be learning important relationships.

To highlight the effectiveness of the multiview approach, it was qualitatively and visually verified that encoders trained via the MV-CRL framework results in more robust representations. A case study analysis was performed on the DLD dataset, comparing the representations learnt from using MoCo (single view) against that of MV-CRL (multi-view).

Using encoders trained by both MoCo and MV-CRL, a query time series sample was chosen to find the one nearest neighbor (1-NN) using cosine similarity in feature space, over all samples in the training dataset.

Figure 11:
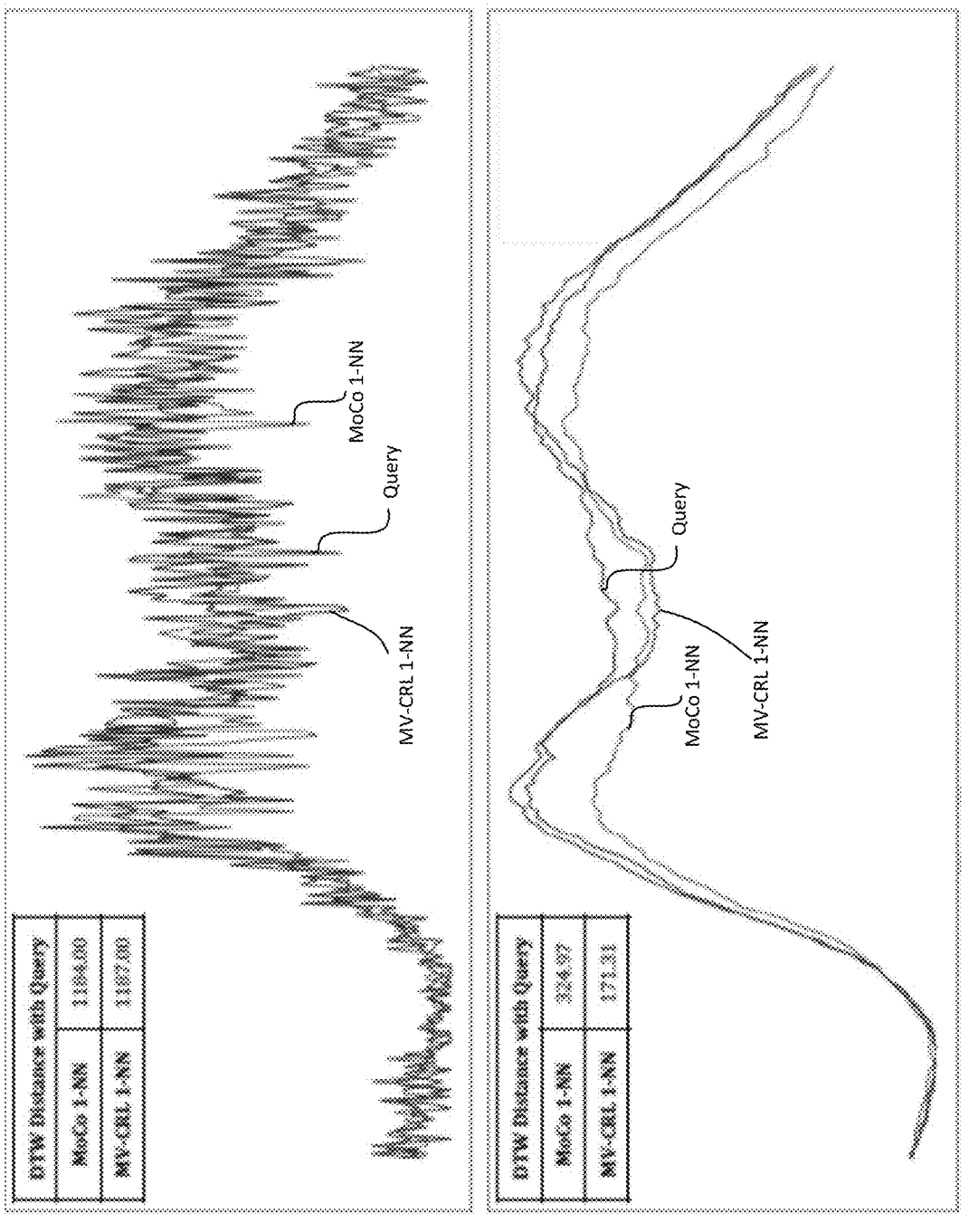
FIG. 11 is a diagram showing visualization of three time series.

FIG. 11 provides a visualization of the three time series in both the original data space, and in the MAF view. The top shows an original view, and the bottom shows the MAF view. The original time series are too noisy to discern via visual inspection in the top original view. When a moving average filter of length 32 is applied on the three time series, it immediately becomes obvious that the 1-NN returned from the MV-CRL encoder is more similar than that of the MoCo encoder in the bottom MAF view. The DTW distance metric between Query and the respective 1-NN time series in the original view and MAF view verifies this as well. Furthermore, this is verified through the class labels of these samples, and confirm that the class label MV-CRL 1-NN matches that of the Query (class label 2), but not for MoCo 1-NN (class label 1).

A multi-view self-supervised representation learning framework is described herein to generalize single view contrastive learning frameworks into the multiview case. Transformations of the data, which yield useful information about the underlying time series, are used as auxiliary views.

These experiments have shown that adding multiple views improves the representations learnt by leveraging the different inter-sample structures present in auxiliary views.

Some examples of computing devices, such as computing device 100 may include non-transitory, tangible, machine readable media that include executable code that when run by one or more processors (e.g., processor 110) may cause the one or more processors to perform the processes of method 400. Some common forms of machine-readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for multi-view contrastive relational learning for time-series prediction, the method comprising:

receiving, via a data interface, a training dataset of data samples of a plurality of time-series sequences;

generating a first set of samples with each sample corresponding to a respective time-step by transforming a time-series sequence of the plurality of time-series sequences via a first transformation;

generating a first set of pairs of random augmentations based on the first set of samples, wherein each pair of the first set of pairs of random augmentations includes random augmentations from the same time-step;

generating, by a main encoder, a set of pairs of representations of the first set of pairs of random augmentations;

generating a second set of samples by transforming the time-series sequence via a second transformation different from the first transformation;

generating a second set of pairs of random augmentations based on the second set of samples, wherein each pair of the second set of pairs of random augmentations includes random augmentations from the same time-step;

generating, by one or more auxiliary encoders, one or more sets of pairs of auxiliary representations of at least the second set of pairs of random augmentations;

computing a contrastive loss component based on similarities between representations from the set of pairs of representations;

computing a relational loss component by:

computing a first value based on a comparison of a random augmentation from the first set of pairs of random augmentations associated with a first time-step, and a random augmentation from the first set of pairs of random augmentations associated with a second time-step, computing a second value based on a comparison of a random augmentation from the second set of pairs of random augmentations associated with the first time-step, and a random augmentation from the second set of pairs of random augmentations associated with the second time-step, and using the second value as a soft-label for the first value in a cross-entropy loss;

computing a combined loss objective by combining the contrastive loss component and the relational loss component;

updating the main encoder based on the combined loss objective via backpropagation;

generating, via the updated main encoder, encoded data based on a measured set of time-series data; and generating a prediction based on the encoded data.

2. The method of claim 1, further comprising:

generating, at each of a one or more auxiliary encoders, a respective contrastive loss objective based on similarities between representations from the one or more set of pairs of auxiliary representations; and updating each of the one or more auxiliary encoders based on the respective contrastive loss respectively.

3. The method of claim 1, wherein each of the one or more auxiliary encoders corresponds to a specific view.

4. The method of claim 1, wherein the first transformation is identity transformation.

5. The method of claim 1, wherein the second transformation includes at least one of moving average, n-th order differencing, or discrete Fourier transformation.

6. The method of claim 1, wherein the contrastive loss component is generated by a non-parametric softmax function.

7. The method of claim 1, wherein the relational loss component is further based on a cross-entropy between intra-symbol pairs from the set of pairs of representations and intra-symbol pairs from the one or more sets of pairs of auxiliary representations.

8. A system for multi-view contrastive relational learning for time-series prediction, the system comprising:

a non-transitory memory; and one or more processors coupled to the non-transitory memory and configured to read instructions from the non-transitory memory to cause the system to perform operations comprising:

receiving, via a data interface, a training dataset of data samples of a plurality of time-series sequences;

generating a first set of samples with each sample corresponding to a respective time-step by transforming a time-series sequence of the plurality of time-series sequences via a first transformation;

generating a first set of pairs of random augmentations based on the first set of samples, wherein each pair of the first set of pairs of random augmentations includes random augmentations from the same time-step;

generating, by a main encoder, a set of pairs of representations of the first set of pairs of random augmentations;

generating a second set of samples by transforming the time-series sequence via a second transformation different from the first transformation;

generating a second set of pairs of random augmentations based on the second set of samples, wherein each pair of the second set of pairs of random augmentations includes random augmentations from the same time-step;

generating, by one or more auxiliary encoders, one or more sets of pairs of auxiliary representations of at least the second set of pairs of random augmentations;

computing a contrastive loss component based on similarities between representations from the set of pairs of representations;

computing a relational loss component by:

computing a first value based on a comparison of a random augmentation from the first set of pairs of random augmentations associated with a first time-step, and a random augmentation from the first set of pairs of random augmentations associated with a second time-step different from the first time-step, computing a second value based on a comparison of a random augmentation from the second set of pairs of random augmentations associated with the first time-step, and a random augmentation from the second set of pairs of random augmentations associated with the second time-step, and using the second value as a soft-label for the first value in a cross-entropy loss;

computing a combined loss objective by combining the contrastive loss component and the relational loss component;

updating the main encoder based on the combined loss objective via backpropagation;

generating, via the updated main encoder, encoded data based on a measured set of time-series data; and generating a prediction based on the encoded data.

9. The system of claim 8, wherein the one or more processor is further configured to cause the system to perform operations comprising:

generating, at each of a one or more auxiliary encoders, a respective contrastive loss objective based on similarities between representations from the one or more set of pairs of auxiliary representations; and updating each of the one or more auxiliary encoders based on the respective contrastive loss respectively.

10. The system of claim 8, wherein each of the one or more auxiliary encoders corresponds to a specific view.

11. The system of claim 8, wherein the first transformation is identity transformation.

12. The system of claim 8, wherein second transformation includes at least one of moving average, n-th order differencing, or discrete Fourier transformation.

13. The system of claim 8, wherein the contrastive loss component is generated by a non-parametric softmax function.

14. The system of claim 8, wherein the relational loss component is further based on a cross-entropy between intra-symbol pairs from the set of pairs of representations and intra-symbol pairs from the one or more sets of pairs of auxiliary representations.

15. A non-transitory, machine-readable medium having stored thereon machine-readable instructions executable to cause a system to perform operations comprising:

receiving, via a data interface, a training dataset of data samples of a plurality of time-series sequences;

generating a first set of samples with each sample corresponding to a respective time-step by transforming a time-series sequence of the plurality of time-series sequences via a first transformation;

generating a first set of pairs of random augmentations based on the first set of samples, wherein each pair of the first set of pairs of random augmentations includes random augmentations from the same time-step;

generating, by a main encoder, a set of pairs of representations of the first set of pairs of random augmentations;

generating a second set of samples by transforming the time-series sequence via a second transformation different from the first transformation;

generating a second set of pairs of random augmentations based on the second set of samples, wherein each pair of the second set of pairs of random augmentations includes random augmentations from the same time-step;

generating, by one or more auxiliary encoders, one or more sets of pairs of auxiliary representations of at least the second set of pairs of random augmentations;

computing a contrastive loss component based on similarities between representations from the set of pairs of representations;

computing a relational loss component by:

computing a first value based on a comparison of a random augmentation from the first set of pairs of random augmentations associated with a first time-step, and a random augmentation from the first set of pairs of random augmentations associated with a second time-step different from the first time-step, computing a second value based on a comparison of a random augmentation from the second set of pairs of random augmentations associated with the first time-step, and a random augmentation from the second set of pairs of random augmentations associated with the second time-step, and computing the relational loss component by using the second value as a soft-label for the first value in a cross-entropy loss;

computing a combined loss objective by combining the contrastive loss component and the relational loss component;

updating the main encoder based on the combined loss objective via backpropagation;

generating, via the updated main encoder, encoded data based on a measured set of time-series data; and generating a prediction based on the encoded data.

16. The non-transitory, machine-readable medium of claim 15, further having stored thereon machine-readable instructions executable to cause the system to perform operations comprising:

generating, at each of a one or more auxiliary encoders, a respective contrastive loss objective based on similarities between representations from the one or more set of pairs of auxiliary representations; and updating each of the one or more auxiliary encoders based on the respective contrastive loss respectively.

17. The non-transitory, machine-readable medium of claim 15, wherein each of the one or more auxiliary encoders corresponds to a specific view.

18. The non-transitory, machine-readable medium of claim 15, wherein the first transformation is identity transformation.

19. The non-transitory, machine-readable medium of claim 15, wherein second transformation includes at least one of moving average, n-th order differencing, or discrete Fourier transformation.

20. The non-transitory, machine-readable medium of claim 15, wherein the relational loss component is further based on a cross-entropy between intra-symbol pairs from the set of pairs of representations and intra-symbol pairs from the one or more sets of pairs of auxiliary representations.

\* \* \* \* \*